US008320746B2

(12) United States Patent
Barrett et al.

(10) Patent No.: US 8,320,746 B2
(45) Date of Patent: Nov. 27, 2012

(54) RECORDED PROGRAMS RANKED BASED ON SOCIAL NETWORKS

(75) Inventors: Peter T Barrett, San Francisco, CA (US); Ronald A Morris, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1069 days.

(21) Appl. No.: 11/956,356

(22) Filed: Dec. 14, 2007

(65) Prior Publication Data

US 2009/0154899 A1   Jun. 18, 2009

(51) Int. Cl.
*H04N 7/26* (2006.01)

(52) U.S. Cl. ........ 386/293; 386/291; 386/296; 386/298; 386/299; 705/14.6; 705/14.49; 705/14.53; 705/14.55; 705/26.7; 705/300; 380/211; 725/46

(58) Field of Classification Search .................. 386/291, 386/293, 296, 298–299, 196; 705/26.7, 300, 705/14.6, 14.49, 14.53, 14.55; 380/211; 725/46

See application file for complete search history.

(56) References Cited

U.S. PATENT DOCUMENTS

| 5,351,075 | A | 9/1994 | Herz et al. |
| 7,069,573 | B1 * | 6/2006 | Brooks et al. ................... 725/62 |
| 7,177,880 | B2 * | 2/2007 | Ruvolo et al. ......................... 1/1 |
| 2003/0023742 | A1 | 1/2003 | Allen et al. |
| 2003/0167324 | A1 * | 9/2003 | Farnham et al. ............. 709/224 |
| 2004/0003405 | A1 | 1/2004 | Boston et al. |
| 2004/0055012 | A1 | 3/2004 | Kimball et al. |
| 2004/0154040 | A1 | 8/2004 | Ellis |
| 2004/0244030 | A1 | 12/2004 | Boyce et al. |
| 2005/0028194 | A1 | 2/2005 | Elenbaas et al. |
| 2005/0147378 | A1 | 7/2005 | Hira |
| 2005/0171955 | A1 * | 8/2005 | Hull et al. ........................ 707/10 |
| 2005/0256756 | A1 * | 11/2005 | Lam et al. ....................... 705/10 |
| 2006/0143081 | A1 * | 6/2006 | Argaiz ............................ 705/14 |

(Continued)

FOREIGN PATENT DOCUMENTS

WO   WO2006079977 A3   8/2006

OTHER PUBLICATIONS

"Cablevision to Test Remote DVR Service ", Apr. 7, 2006, United Press International, p. 1.

(Continued)

*Primary Examiner* — Kambiz Zand
*Assistant Examiner* — Tongoc Tran
(74) *Attorney, Agent, or Firm* — Wolfe-SBMC

(57) ABSTRACT

Recorded programs ranked based on social networks is described. In embodiment(s), a content distributor maintains recorded on-demand assets that can be requested by client devices to render as television media content for viewing. For a Network Digital Video Recording (nDVR) system, the recorded on-demand assets are recorded when initially distributed to the client devices as scheduled television media content. The content distributor can form a social network of members based on association(s) of viewers that correspond to one or more of the client devices, and can determine recommended on-demand assets from different ones of the recorded on-demand assets for the members of the social network. The content distributor can then communicate a recommended on-demand asset to a client device that corresponds to a member of the social network where the recommended on-demand asset is communicated for viewing without receiving a viewer selection of the recommended on-demand asset.

18 Claims, 6 Drawing Sheets

U.S. PATENT DOCUMENTS

| | | |
|---|---|---|
| 2006/0167959 A1 | 7/2006 | Pronk |
| 2006/0184579 A1* | 8/2006 | Mills et al. ................ 707/104.1 |
| 2006/0282304 A1* | 12/2006 | Bedard et al. .................. 705/10 |
| 2007/0033607 A1 | 2/2007 | Bryan |
| 2007/0157239 A1 | 7/2007 | Wang et al. |
| 2007/0162502 A1* | 7/2007 | Thomas et al. ............ 707/104.1 |
| 2008/0010372 A1* | 1/2008 | Khedouri et al. ............ 709/224 |
| 2008/0104624 A1* | 5/2008 | Narasimhan et al. ........... 725/13 |
| 2008/0134043 A1* | 6/2008 | Georgis et al. ................ 715/733 |

OTHER PUBLICATIONS

"TiVo's StopWatch(TM) Ratings Service to Provide Monthly Rankings of Top Commercials as Viewed by Tivo Subscribers", TiVo Inc., 2007, pp. 11.

* cited by examiner

RECORDED PROGRAMS RANKED BASED ON SOCIAL NETWORKS

BACKGROUND

Scheduled television programming can be recorded at the time of broadcast when initially distributed for viewing, and can then be made available for on-demand viewing when requested by users of a television content distribution system. This is commonly referred to as Network Digital Video Recording (nDVR) and a viewer can request the recorded television content, such as movies and television programs, when convenient for the viewer. In this type of television content distribution system, the specific day and time that television content is broadcast is no longer the primary criteria for sorting the recorded television content, such as in a program guide (also commonly referred to as an electronic program guide or "EPG"). Because the recorded television content can be requested for viewing at any time that is convenient for a viewer, the grid structure of a program guide that indicates the day, time, and television channel for the selection and viewing of television content is almost irrelevant since users are not actually viewing the content when it is originally broadcast.

Having such a large selection of on-demand television content available, such as movies and television programs, can make it difficult for a viewer to locate something to watch that may be of interest to the viewer. The recorded television programs and movies that are available from an nDVR system are typically sorted alphabetically by title or by genre which can make it difficult for a viewer to find new viewing options that may be of interest to the viewer. In this type of system, a viewer can likely find a movie or television program if the title is already known. However, a viewer may never find unknown television content that would also be of interest to the viewer.

Collaborative filtering attempts to use the characteristics of other people to help determine what someone similar may be interested in watching. The primary problem with collaborative filtering is being able to associate a group of people from which to base movie and other television program recommendations. Traditional techniques for collaborative filtering use characteristics of the people in a group, such as age, gender, race, and/or location to create the groups. However, these traditional techniques rely on a presumption that people having some similar characteristics also share similar interests in movies and television program viewing choices. Thus, these traditional techniques associate people into groups, yet the people may not have common interests or even any basis from which to determine a likelihood of interest in the same movies and program viewing choices.

SUMMARY

This summary is provided to introduce simplified concepts of recorded programs ranked based on social networks. The simplified concepts are further described below in the Detailed Description. This summary is not intended to identify essential features of the claimed subject matter, nor is it intended for use in determining the scope of the claimed subject matter.

Recorded programs ranked based on social networks is described. In embodiment(s), a content distributor maintains recorded on-demand assets that can be requested by client devices to render as television media content for viewing. For a Network Digital Video Recording (nDVR) system, the recorded on-demand assets are recorded when initially distributed to the client devices as scheduled television media content. The content distributor can form a social network of members based on association(s) of viewers that correspond to one or more of the client devices, and can determine recommended on-demand assets from different ones of the recorded on-demand assets for the members of the social network. The content distributor can then communicate a recommended on-demand asset to a client device that corresponds to a member of the social network where the recommended on-demand asset is communicated for viewing without receiving a viewer selection of the recommended on-demand asset.

In other embodiment(s) of recorded programs ranked based on social networks, the content distributor includes a client device monitor that monitors the activation state of the client devices that correspond to the members of the social network. The client device monitor can receive an indication that a client device is activated to render television media content for viewing. The content distributor can then communicate the recommended on-demand assets to the activated client device that renders the recommended on-demand assets in succession without viewer interaction.

In other embodiment(s) of recorded programs ranked based on social networks, the content distributor includes an auto-view service that can generate an auto-view program list of the recommended on-demand assets. Alternatively, the auto-view service can be implemented apart from the content distributor as an independent entity. The client device monitor can receive an indication that a client device is activated to render television media content for viewing, and the auto-view service can then communicate the auto-view program list to the client device for display as a user interface from which the recommended on-demand assets can be selected for viewing.

BRIEF DESCRIPTION OF THE DRAWINGS

Embodiments of recorded programs ranked based on social networks are described with reference to the following drawings. The same numbers are used throughout the drawings to reference like features and components.

DETAILED DESCRIPTION

Figure 1:
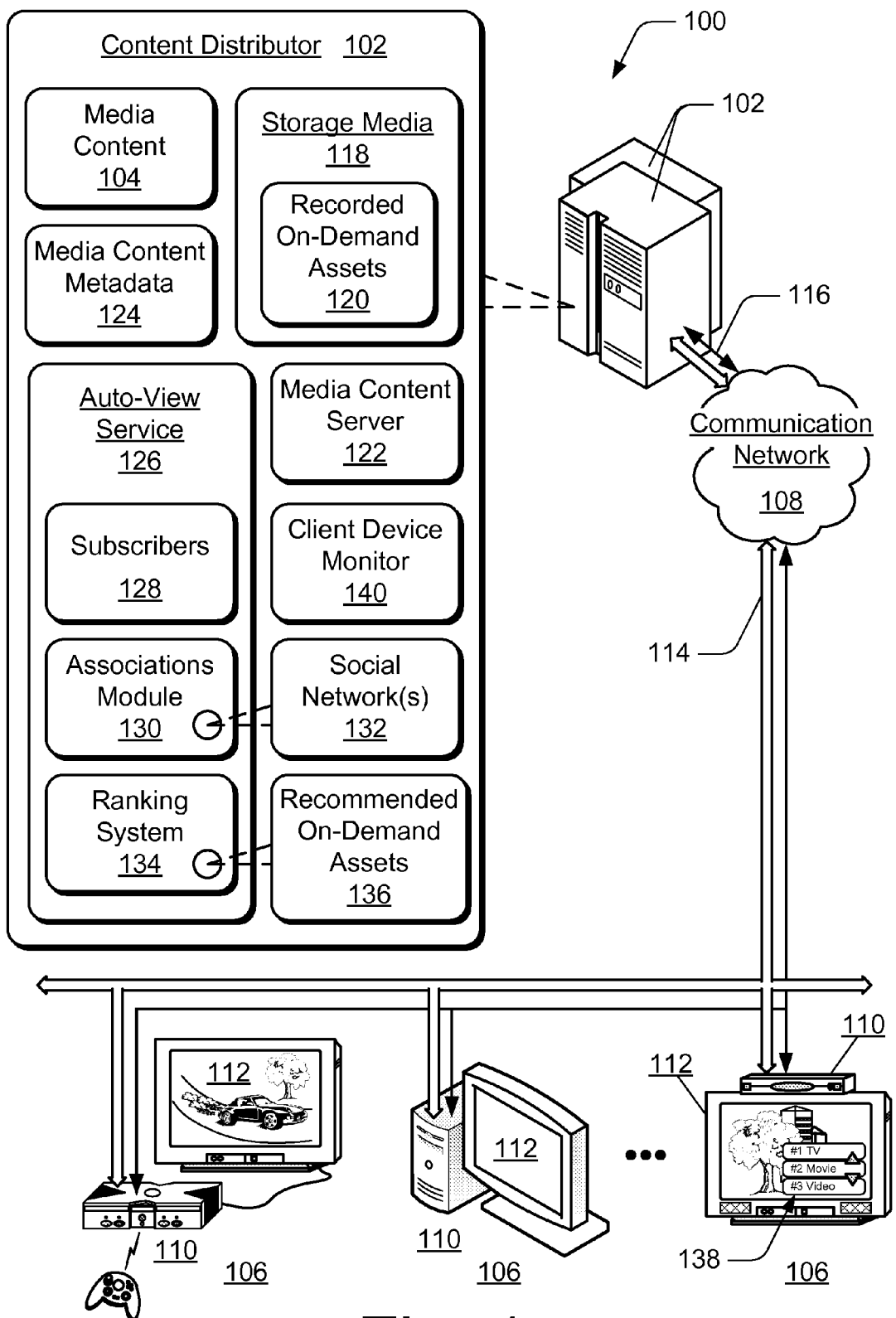
FIG. 1 illustrates an example system in which embodiments of recorded programs ranked based on social networks can be implemented.

Embodiments of recorded programs ranked based on social networks provide a technique to associate viewers in a television media content distribution system as members of social network(s), and then determine recommended content for the members of a social network. In an embodiment, viewers (also referred to herein as "users") can be associated as members of a social network, and different social networks can be formed with members that are associated by one or several aspects. A social network can be formed to include members who are more likely to have an association with each other, and therefore common interests and media content preferences. For example, viewers can be associated by collaborative filtering, such as by age, gender, race, and/or location, to create a group from which a social network can then be formed based on sets of the viewers that watch the same or similar television media content, such as programs and movies.

In other embodiments, all of the viewers, or a subset of the viewers, in a television media content distribution system can be associated as members of a social network. In addition, viewers can be associated as members of various other social networks, such as subscribers to an auto-view service, any type of social organization, a family members social network, members of a social network determined by the system, and the like. Viewers can also be associated in a social network as time-based viewing members, such as morning television viewers, daytime television viewers, evening television viewers, and/or late night television viewers.

An auto-view program list can be displayed for a viewer as a user interface from which the viewer can select recommended content for viewing, such as recorded on-demand assets in a Network Digital Video Recording (nDVR) system. The various recommended content can be displayed in the auto-view program list in an order with a most popular or first recommended on-demand asset shown first in the list, a second recommended on-demand asset shown second, as so on. The auto-view program list can also optionally include viewer-designated television media content. For example, a particular viewer may want to include the recorded broadcast of the local news as the first recommended on-demand asset which is displayed for viewing automatically when the viewer activates the client device to render television media content for viewing.

When a client device is activated to render television media content for viewing, such as when a viewer turns the device on to watch television, the recommended on-demand assets can be communicated to the client device in succession such that the client device renders the recommended on-demand assets for viewing in succession without viewer interaction. The most popular, recommended, and/or viewer preferred media content is automatically shown for viewing. If however a viewer does not want to watch the currently displayed media content, the viewer can simply select the next recommended on-demand asset from the auto-view program list, or scroll the auto-view program list to display other recommended on-demand assets for selection. As such, television viewing is not day, channel, or time-dependent, but rather a viewer can simply activate a client device at any time that is convenient for the viewer to watch recommended content in succession.

While features and concepts of the described systems and methods for recorded programs ranked based on social networks can be implemented in any number of different environments, systems, and/or various configurations, embodiments of recorded programs ranked based on social networks are described in the context of the following example systems and environments.

FIG. 1 illustrates an example system 100 in which various embodiments of recorded programs ranked based on social networks can be implemented. In this example, system 100 includes content distributor(s) 102 that communicate media content 104 to any number of various television client systems 106 via a communication network 108. In a Network Digital Video Recording (nDVR) implementation, a content distributor 102 can be implemented to record media content 104, such as movies and television programs, when the media content is initially distributed to the client systems 106 as scheduled television programming.

Each of the television client systems 106 include a respective client device 110 and display device 112 that together render audio, video, and/or image data. A display device 112 can be implemented as any type of a television, LCD, or similar display system. A client device 110 can be implemented as any one or combination of a television client device, a digital video recorder (DVR), an appliance device, a gaming console, a computer device, a portable communication device, a portable computing device, and/or as any other type of client device that may be implemented in a television distribution system.

A client device 110 can also be implemented with one or more processors, communication components, memory components, and a media content rendering system. Further, any of the client devices 110 can be implemented with any number and combination of differing components as further described with reference to the example device shown in FIG. 5. A client device 110 may also be associated with a user or viewer (i.e., a person) and/or an entity that operates the device such that a client device describes logical clients that include users, software, and/or devices.

The communication network 108 can be implemented to include an IP-based network 114 and/or a broadcast network that facilitates media content distribution and data communication between the content distributor(s) 102 and any number of client devices 110. The communication network 108 can be implemented as part of a media content distribution system using any type of network topology and/or communication protocol, and can be represented or otherwise implemented as a combination of two or more networks.

A client device 110 can communicate with any number of content distributors 102 via a two-way data communication link 116 of the communication network 108. It is contemplated that any one or more of the arrowed communication link 116 and network 114, along with communication network 108, facilitate two-way data communication, such as from a client device 110 to a content distributor 102 and vice-versa.

In the example system 100, content distributor 102 includes storage media 118 to store or otherwise maintain various data and media content, such as recorded on-demand assets 120. In an nDVR implementation, the recorded on-demand assets 120 can be recorded when initially distributed to the various client devices 110 as scheduled television media content. Any of the recorded on-demand assets 120 can be requested by a client device 110 to render as television media content for viewing. The content distributor 102 also includes a media content server 122 that can provide, communicate, or otherwise distribute the media content 104, recorded on-demand assets 120, media content metadata 124, and/or other data to any number of the client devices 110 as an IPTV multicast via the IP-based network 114 and/or the communication network 108.

The media content 104 and/or recorded on-demand assets 120 (e.g., recorded media content) can include any type of audio, video, and/or image media content received from any type of media content source. As described throughout, "media content", "recorded media content", and "television media content" can include television programs (or programming) which may be any form of programs, advertisements, commercials, music, movies, and on-demand media content.

Other media content can include interactive games, network-based applications, and any other audio, video, and/or image content (e.g., to include program guide application data, user interface data, search results and/or recommendations, and the like).

The content distributor 102 can also include various components to implement embodiments of recorded programs ranked based on social networks, such as an auto-view service 126. The auto-view service 126 can be implemented as computer-executable instructions and executed by processor(s) to implement various embodiments and/or features of recorded programs ranked based on social networks. In an embodiment, viewers (also referred to herein as "users") can be associated as members of a social network, and different social networks can be formed with members that are associated by one or several aspects. For example, viewers can be associated by collaborative filtering, such as by age, gender, race, and/or location, to create a group from which a social network can then be formed based on sets of the viewers that watch the same or similar television media content.

In this example, the auto-view service 126 includes subscribers 128 to the auto-view service, as well as an associations module 130 and a ranking system 134 that can each implement aspects of recorded programs ranked based on social networks. In addition, a content distributor 102 can be implemented with any number and combination of differing components as further described with reference to the example device shown in FIG. 5 and/or the example content distributor shown in FIG. 6. The associations module 130 and/or the ranking system 134, as well as other functionality described to implement embodiments of recorded programs ranked based on social networks, can also be provided by a service apart from the content distributor 102 (e.g., on a separate server or by a third party service).

The associations module 130 can be implemented to form one or more social networks 132 of members based on an association of viewers that correspond to one or more of the client devices 110. In an embodiment, a social network 132 can include all of the users in a television media content distribution system, such as determined by user accounts associated with the different client devices 110 (where one user account may actually represent several viewers, such as in a family). A user may also have a user account that is associated with a variety of client devices, services, and so forth. The viewing selections of a viewer or viewers that are associated with a user account can be compiled and used to associate the viewer, viewers, and/or the user account with a social network 132 (or with more than one social network). The social network(s) 132 can be based on which of the other users and/or viewers have similar viewing habits or preferences.

In another embodiment, the associations module 130 can be implemented to track and compile requests for different ones of the recorded on-demand assets 120 received from the various client devices 110 that correspond to the members of the social network(s) 132. The requests for movies, on-demand media content, other television programs, and/or different ones of the recorded on-demand assets 120 can be compiled according to the various members of different social networks 132. In another embodiment, a social network 132 may include members that are the subscribers 128 to the auto-view service 126. The auto-view service 126 can be implemented as a viewer optional service and/or as a service that the subscribers 128 pay for to receive viewing recommendations.

In addition to social networks based on all of the users in a television media content distribution system and/or user accounts that correspond to client devices 110 of the system, the social network(s) 132 can be formed based on various other member associations. For example, a social network of "Friends" can include members that are associated as a peer group, co-workers, social group, hobby group, and/or any other social organization. Another social network of "Family" can include members that are associated as family members and/or extended family members. In an embodiment, a social network may also be viewer initiated and/or configurable, such as to include the members in the "Friends" social network, or to include the members in the "Family" social network.

Another social network may be formed with members that are determined by the system, such as based on the media content metadata 124 that corresponds to the recorded on-demand assets 120 which are requested by various viewers throughout the system. Other social networks may also be formed as determined from time-based viewing. For example, the associations module 130 can associate morning viewers as members of one social network, and form other similar social networks for daytime viewers, evening viewers, and late night viewers due to the likelihood that the different time-based viewers will have different viewing preferences.

The ranking system 134 can be implemented to determine recommended on-demand assets 136 for the members of the social network(s) 132. In an embodiment, the recommended on-demand assets 136 can be determined from different ones of the recorded on-demand assets 120. The ranking system 134 can rank the recorded on-demand assets 120 based on any of the social network member associations described above. For example, the popular or recommended on-demand assets 136 for the members of a social network can be determined based on the similar viewing preferences and/or viewing times of the members. The popular or recommended on-demand assets 136 can be based on viewer selections, or the selections from a subset of the viewers, such as a top number of the requested or selected recorded on-demand assets 120.

Although illustrated as described as components of the auto-view service 126 at content distributor 102, the associations module 130 and the ranking system 134 can each be implemented as stand-alone components to implement embodiments of recorded programs ranked based on social networks. Further, although the associations module 130 and the ranking system 134 are each illustrated and described as single applications or modules (e.g., independent components of content distributor 102), each can be implemented as several component applications or modules distributed to implement various embodiments of recorded programs ranked based on social networks. Alternatively, the associations module 130 and the ranking system 134 can be implemented together as a multi-functional component and/or as a component of the auto-view service 126 at content distributor 102 to implement embodiments of recorded programs ranked based on social networks.

In an embodiment, the auto-view service 126 can be implemented to generate an auto-view program list 138 of the recommended on-demand assets 136 for communication to the various client devices 110 that correspond to the members of a social network. In this example, the auto-view program list 138 is shown as a linear list of the recommended on-demand assets 136, and as a user interface from which a viewer can select an on-demand asset for viewing. The content distributor 102 also includes a client device monitor 140 that can be implemented to receive an indication that a client device 110 is activated to render the television media content for viewing. The auto-view service 126 can then initiate communication of the auto-view program list 138 to the client device 110 for display as a user interface from which the recommended on-demand assets 136 can be selected for viewing. Alternatively, or in addition, the media content server 122 at content distributor 102 can be implemented to communicate the recommended on-demand assets 136 to the client device 110 that renders the recommended on-demand assets in succession without viewer interaction.

Figure 2:
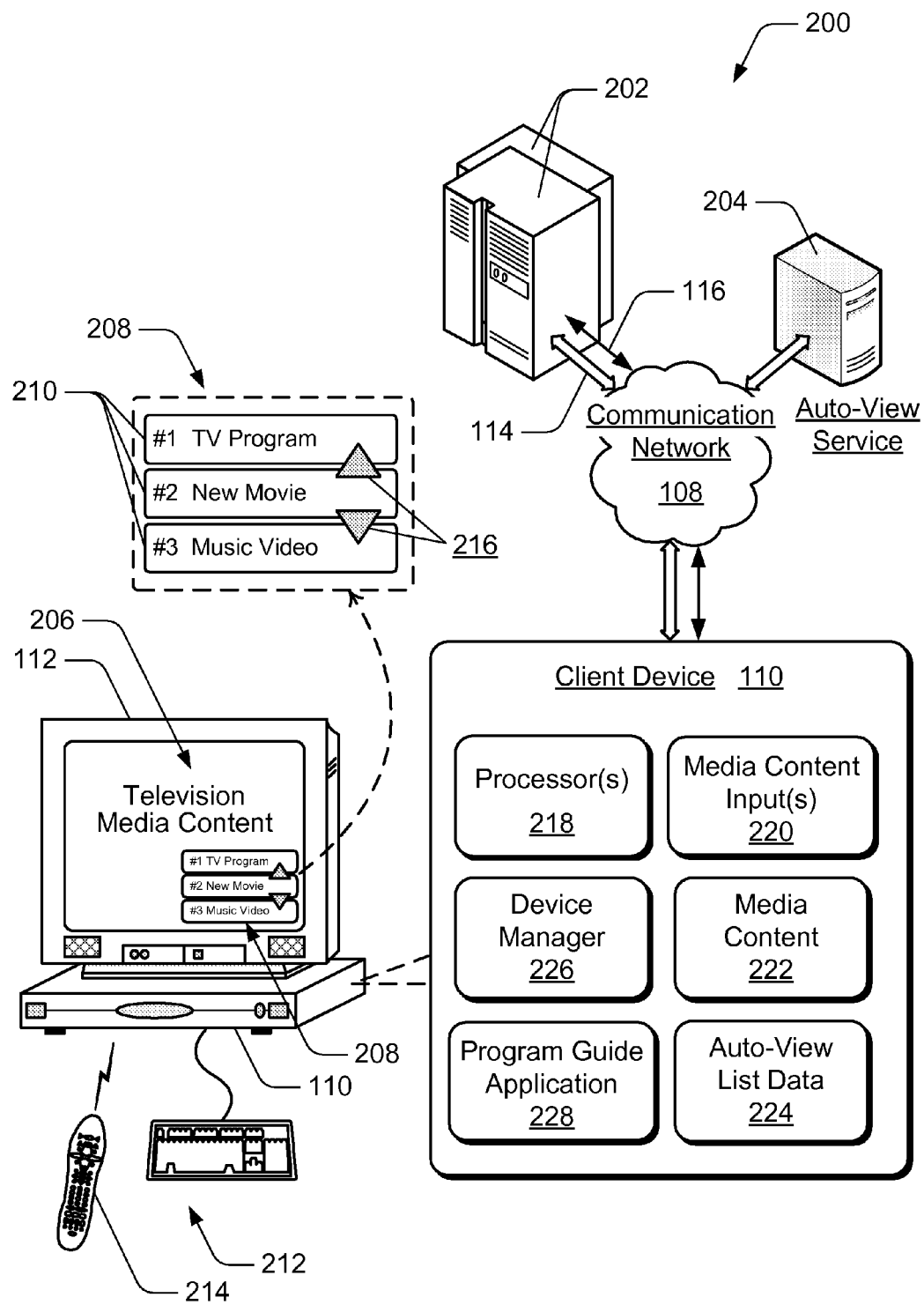
FIG. 2 illustrates another example system in which embodiments of recorded programs ranked based on social networks can be implemented.

FIG. 2 illustrates an example system 200 in which various embodiments of recorded programs ranked based on social networks can be implemented. In this example, system 200 includes content distributor(s) 202 and an independent auto-view service 204, as well as a client device 110 and a display device 112 that can display television media content 206 and/or an auto-view program list 208. A viewer can interact with client device 110 and initiate viewer navigation inputs and selections of recommended on-demand assets 210 from the auto-view program list 208 with user inputs on various input devices 212, such as a remote control device 214. For example, the auto-view program list 208 includes selectable controls 216 that can be selected with remote control inputs to scroll the auto-view program list 208 up and/or down to display other recommended on-demand assets 210.

The auto-view program list 208 is displayed as a user interface from which a viewer can select a recommended on-demand asset 210 for viewing. In an alternative embodiment, an auto-view program list can be implemented for display as a channel in a program guide for an IPTV system. In the example auto-view program list 208, the recommended on-demand assets 210 are displayed in an order with a most popular or first recommended on-demand asset shown first in the list, a second recommended on-demand asset shown second, as so on. An auto-view program list can also optionally include viewer-designated television media content. For example, a particular viewer may want to include the recorded broadcast of the local news as the first recommended on-demand asset 210 which is displayed for viewing automatically when the viewer activates the client device to render television media content for viewing.

When the client device 110 is activated to render television media content for viewing, such as when a viewer turns the device on to watch television, the content distributor 202 can communicate the recommended on-demand assets to the client device 110 such that the client device renders the recommended on-demand assets for viewing in succession without viewer interaction. The most popular, recommended, and/or viewer preferred media content is automatically shown for viewing. If however a viewer does not want to watch the currently displayed media content, the viewer can simply select the next recommended on-demand asset from the auto-view program list, or scroll the auto-view program list 208 to display other recommended on-demand assets for selection. As such, television viewing is not day, channel, or time-dependent, but rather a viewer can simply activate the client device 110 at any time that is convenient for the viewer.

An example of a content distributor is described with reference to content distributor 102 shown in FIG. 1. However, in this example system 200, the auto-view service 204 is independent and implemented apart from content distributor 202 (e.g., on a separate server or by a third party service). The auto-view service 204 can be implemented as a viewer optional service and/or as a service that viewers pay for to receive recommended on-demand assets 210 and/or an auto-view program list 208. The content distributor 202, auto-view service 204, and the client device 110 can all be implemented for communication with each other via the communication network 108 and/or the IP-based network 114.

In the example system 200, client device 110 includes one or more processors 218 (e.g., any of microprocessors, controllers, and the like), media content inputs 220, and media content 222 (e.g., received media content, media content that is being received, recommended on-demand assets, etc.). The media content inputs 220 can include any type of wireless, broadcast, and/or over-the-air inputs via which media content is received. In addition, client device 110 can receive auto-view list data 224 from a content distributor 202 via the media content inputs 220.

Client device 110 also includes a device manager 226 (e.g., a control application, software application, etc.) that can be implemented as computer-executable instructions and executed by the processor(s) 218 to implement various embodiments and/or features of recorded programs ranked based on social networks. The device manager 226 can be implemented to monitor and/or receive selectable inputs (e.g., viewer selections, navigation inputs, etc.) via an input device 212, and initiate communication of viewer selections back to a content distributor 202.

Client device 110 can also include a program guide application 228 which can be implemented as computer-executable instructions and executed by the processor(s) 218 to implement various embodiments and/or features of recorded programs ranked based on social networks. The program guide application 228 can be implemented to process the auto-view list data 224 from which the auto-view program list 208 can be rendered and/or displayed for viewing on display device 112. The auto-view program list 208 can implemented for display as a module, user interface, and/or component of the program guide application 228.

Generally, any of the functions, methods, procedures, and modules described herein can be implemented using hardware, software, firmware (e.g., fixed logic circuitry), manual processing, or any combination thereof. A software implementation of a function, method, procedure, or module represents program code that performs specified tasks when executed on a computing-based processor. Example methods 300 and 400 described with reference to respective FIGS. 3 and 4 may be described in the general context of computer-executable instructions. Generally, computer-executable instructions can include applications, routines, programs, objects, components, data structures, procedures, modules, functions, and the like that perform particular functions or implement abstract data types.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
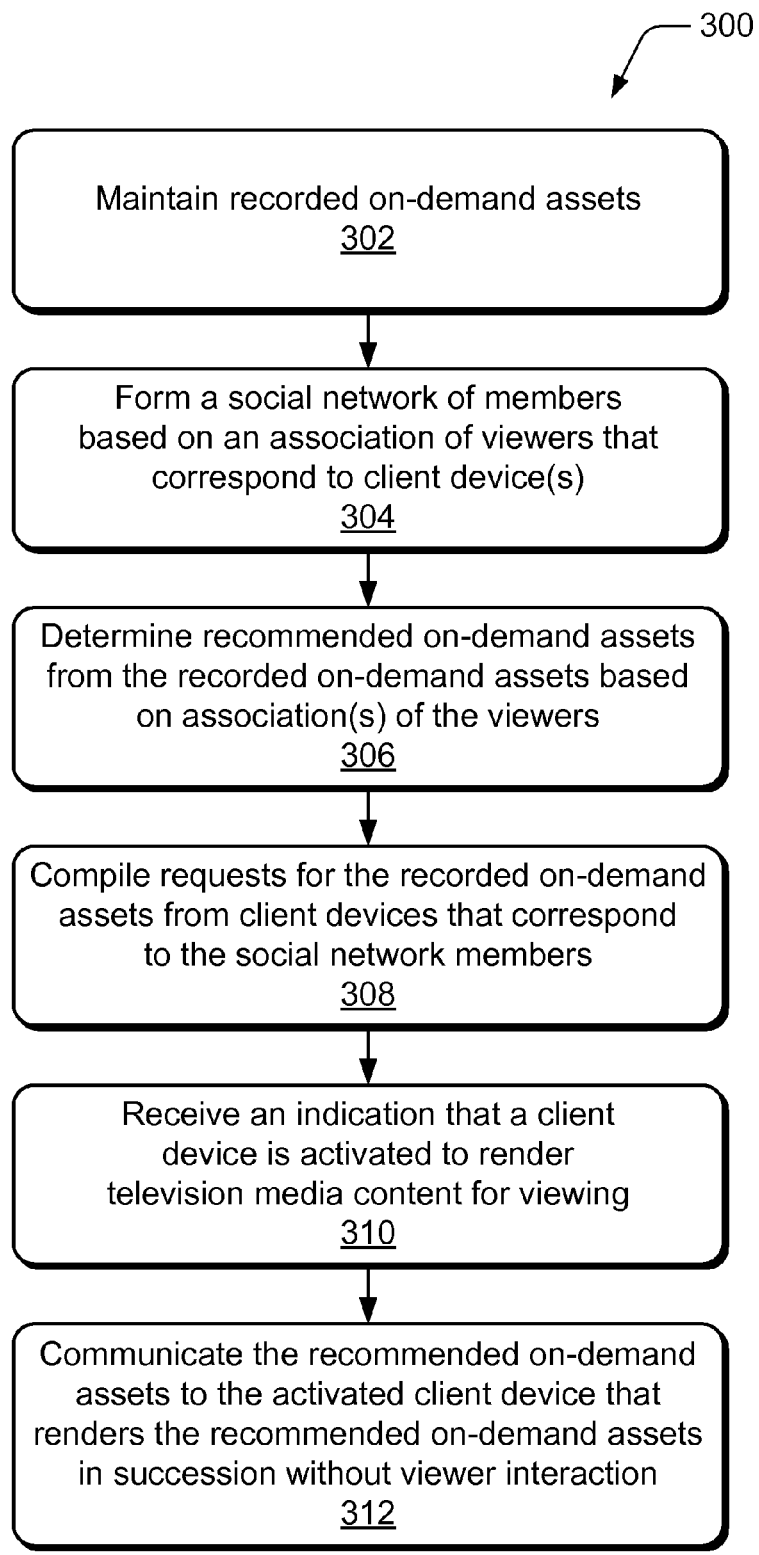
FIG. 3 illustrates example method(s) for recorded programs ranked based on social networks in accordance with one or more embodiments.

FIG. 3 illustrates example method(s) 300 of recorded programs ranked based on social networks. The order in which the method is described is not intended to be construed as a limitation, and any number of the described method blocks can be combined in any order to implement the method, or an alternate method.

At block 302, on-demand assets are recorded and maintained at a content distributor. For example, content distributor 102 records media content 104, such as movies, television programs, music videos, and the like, and then maintains the recorded media content as the recorded on-demand assets 120 with storage media 118. In a Network Digital Video Recording (nDVR) implementation, the content distributor 102 records the scheduled television programming when it is initially distributed to the client devices 110 for viewing.

At block 304, a social network of members is formed based on an association of viewers that correspond to one or more client devices. For example, the associations module 130 at content distributor 102 determines association(s) of viewers and/or users that correspond to the various client devices 110. The viewers and/or users can be associated as members of a social network 132 based on any number of aspects, such as all of the viewers in a television media content distribution system, a subset of the viewers, subscribers to an auto-view service, a social organization, a family members social network, time-based viewing members, members of a social network determined by the system, members of a social network determined by collaborative filtering and viewing interests, and the like.

At block 306, recommended on-demand assets are determined from the recorded on-demand assets based on association(s) of the viewers that are the members of the social network. For example, the ranking system 134 at content distributor 102 determines recommended on-demand assets 136 from different ones of the recorded on-demand assets 120. In various implementations, the ranking system 134 can determine the recommended on-demand assets 136 based on association(s) of the viewers that are the members of the social network. In another implementation, the ranking system 134 can determine the recommended on-demand assets 136 based on requests for the recorded on-demand assets 120.

At block 308, requests for the recorded on-demand assets are compiled when received from client devices that correspond to the members of the social network. For example, the associations module 130 at content distributor 102 compiles requests for the recorded on-demand assets 120 that are received from the various client devices 110, and correlates the requests that are received from the client devices 110 which correspond to the members of a particular social network 132.

At block 310, an indication is received that a client device is activated to render television media content for viewing. For example, the client device monitor 140 at content distributor 102 monitors the device state of the various client devices 110 and can receive an indication that a client device has been activated to render television media content for viewing. An indication that a client device 110 has been activated can include a power-on indication, a channel change input, a volume adjustment input, a program guide input or request, and the like.

At block 312, the recommended on-demand assets are communicated to the activated client device that renders the recommended on-demand assets in succession without viewer interaction. For example, the media content server 122 at content distributor 102 communicates the recommended on-demand assets 136 (e.g., from the recorded on-demand assets 120 and/or viewer-optional preferences) to the activated client device (from block 310) which can then render the recommended on-demand assets 136 in succession without viewer interaction.

Figure 4:
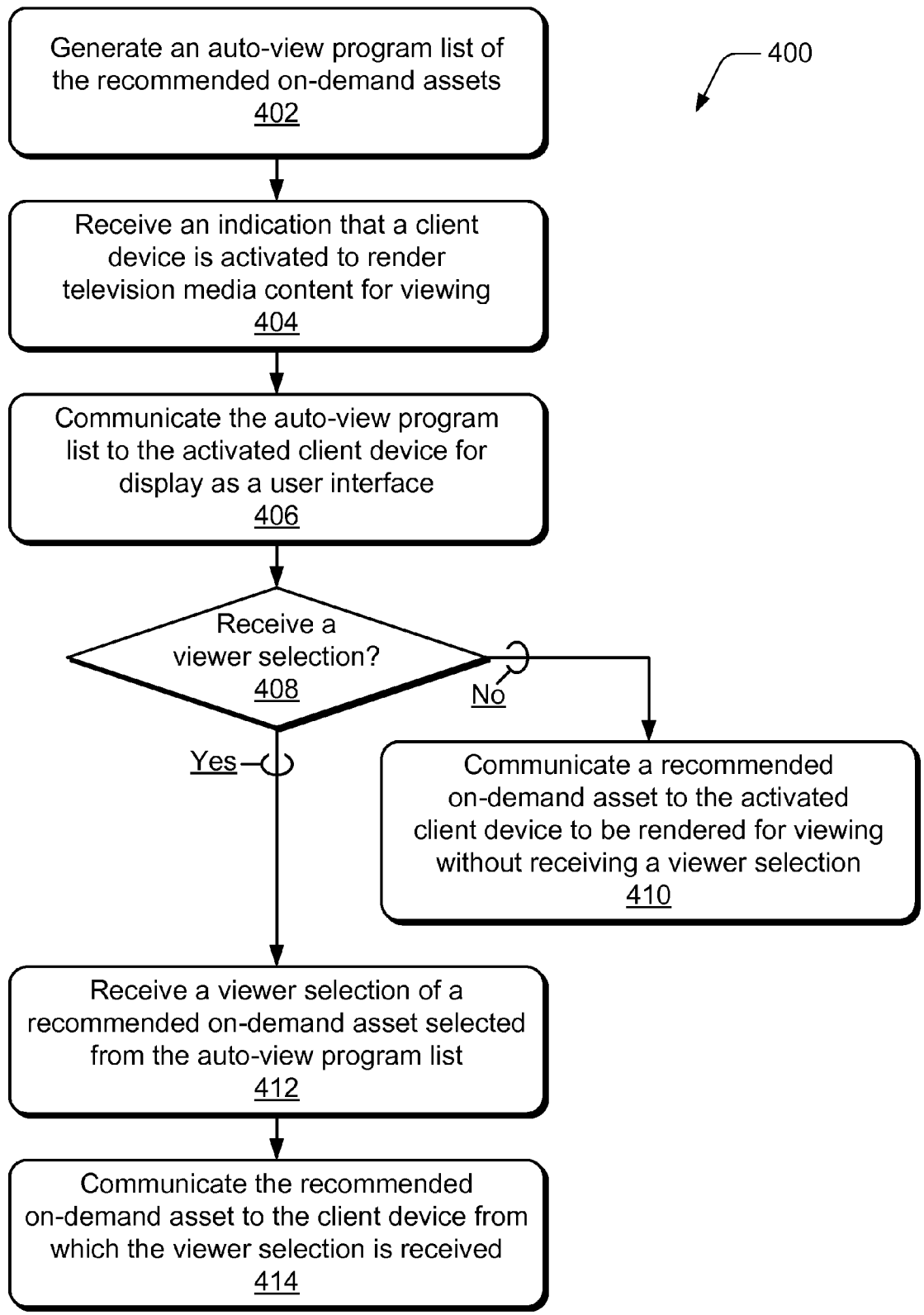
FIG. 4 illustrates example method(s) for recorded programs ranked based on social networks in accordance with one or more embodiments.

FIG. 4 illustrates example method(s) 400 of recorded programs ranked based on social networks. The order in which the method is described is not intended to be construed as a limitation, and any number of the described method blocks can be combined in any order to implement the method, or an alternate method.

At block 402, an auto-view program list of the recommended on-demand assets is generated. For example, the auto-view service 126 (FIG. 1) at content distributor 102 generates the auto-view program list 138 of the recommended on-demand assets 136. In another example, the independent auto-view service 204 (FIG. 2) provides the auto-view list data 224 from which the auto-view program list 208 is generated for display as a user interface from which a viewer can select a recommended on-demand asset 210 for viewing.

At block 404, an indication is received that a client device is activated to render television media content for viewing. For example, the client device monitor 140 at content distributor 102 monitors the device state of the various client devices 110 and can receive an indication that a client device has been activated to render television media content for viewing. An indication that a client device 110 has been activated can include a power-on indication, a channel change input, a volume adjustment input, a program guide input or request, and the like.

At block 406, the auto-view program list is communicated to the activated client device for display as a user interface. For example, media content server 122 and/or the auto-view service 126 at content distributor 102 communicate auto-view list data to a client device 110 from which the auto-view program list 138 is generated for display as a user interface, and from which a viewer can select a recommended on-demand asset for viewing. In another example, the auto-view service 204 provides auto-view list data 224 to client device 110 from which the auto-view program list 208 is generated for display as a user interface, and from which a viewer can select a recommended on-demand asset 210 for viewing.

At block 408, a determination is made as to whether a viewer selection of a recommended on-demand asset from an auto-view program list is received. For example, client device monitor 140 at content distributor 102 monitors the various client devices 110 for viewer-initiated navigation inputs and selections of recommended on-demand assets. If a viewer selection is not received from the activated client device (i.e., "no" from block 408), then at block 410, a recommended on-demand asset is communicated to the activated client device to be rendered for viewing without receiving a viewer selection. For example, the media content server 122 at content distributor 102 communicates a recommended on-demand asset 136 to the activated client device (from block 404) which can then render the recommended on-demand asset 136 for viewing without receiving a viewer selection from the auto-view program list 138.

If a viewer selection is received from the activated client device (i.e., "yes" from block 408), then at block 412, the viewer selection is received as a recommended on-demand asset selected from the auto-view program list. For example, the client device monitor 140 at content distributor 102 monitors the device state of the various client devices 110 and can receive a viewer selection of a recommended on-demand asset 136 from the auto-view program list 138.

At block 414, the recommended on-demand asset is communicated to the client device from which the viewer selection is received. For example, the media content server 122 at content distributor 102 communicates the recommended on-demand asset that has been selected to the client device 110 from which the viewer selection is received (at block 412) such that the client device 110 can render the recommended on-demand asset for viewing.

Figure 5:
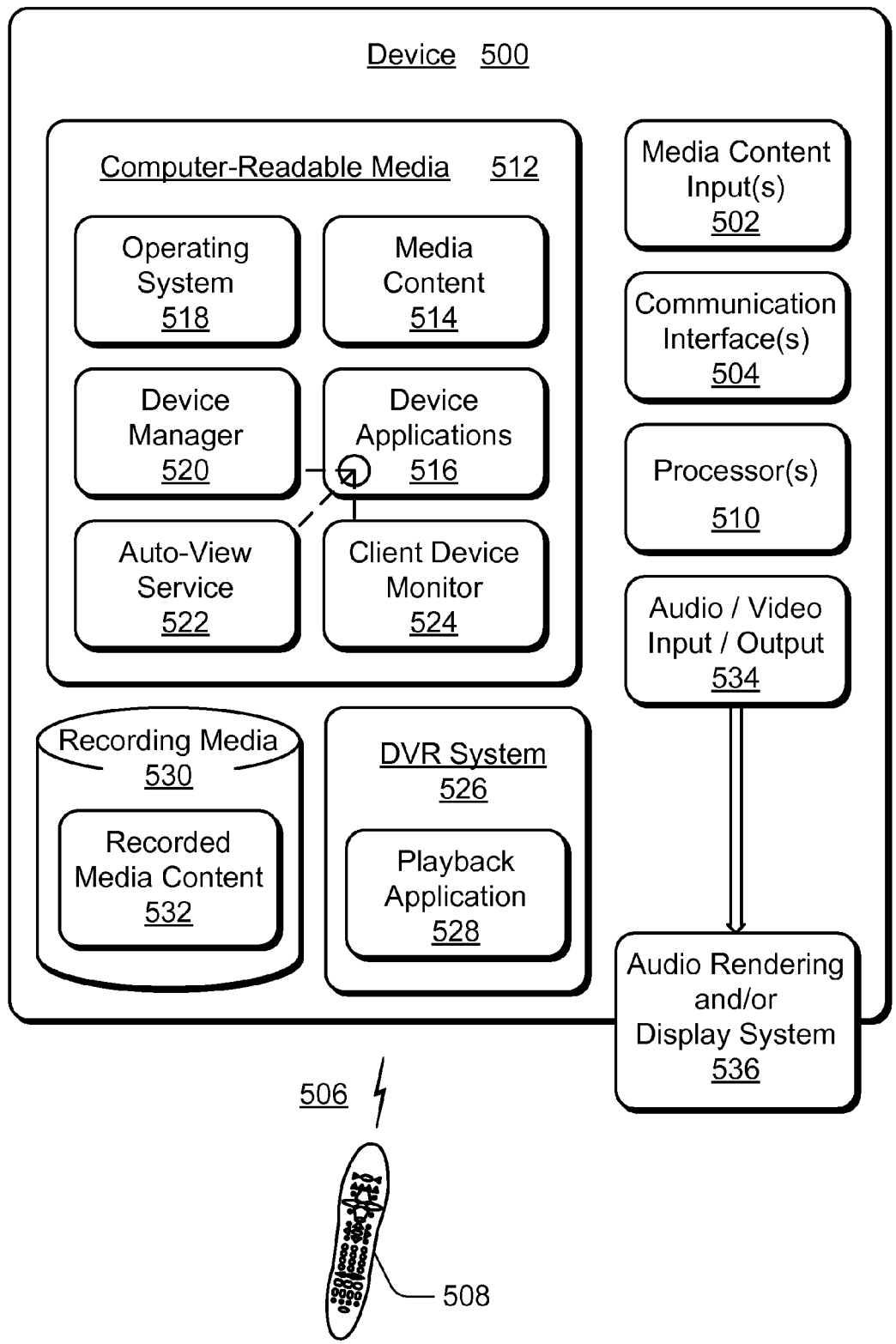
FIG. 5 illustrates various components of an example device which can implement embodiments of recorded programs ranked based on social networks.

FIG. 5 illustrates various components of an example device 500 that can be implemented as any form of a computing, electronic, and/or appliance device to implement various embodiments of recorded programs ranked based on social networks. For example, device 500 can be implemented as a content distributor, auto-view service, and/or client device as shown in FIG. 1 and/or FIG. 2. In various embodiments, device 500 can be implemented as any one or combination of a television client device, a digital video recorder (DVR), a gaming system or console, a computing-based device, and/or as any other type of similar device.

Device 500 includes one or more media content inputs 502 that may include Internet Protocol (IP) inputs over which streams of media content are received via an IP-based network. Device 500 further includes communication interface(s) 504 that can be implemented as any one or more of a serial and/or parallel interface, a wireless interface, any type of network interface, a modem, and as any other type of communication interface. A network interface provides a connection between device 500 and a communication network by which other electronic and computing devices can communicate data with device 500.

Similarly, a serial and/or parallel interface provides for data communication directly between device 500 and the other electronic or computing devices. A modem also facilitates communication with other electronic and computing devices via a conventional telephone line, a DSL connection, cable, and/or other type of connection. A wireless interface enables device 500 to receive control input commands 506 and other data from an input device, such as from remote control device 508, a portable computing-based device (such as a cellular phone), or from another infrared (IR), 802.11, Bluetooth, or similar RF input device.

Device 500 also includes one or more processors 510 (e.g., any of microprocessors, controllers, and the like) which process various computer-executable instructions to control the operation of device 500, to communicate with other electronic and computing devices, and to implement embodiments of recorded programs ranked based on social networks. Device 500 can be implemented with computer-readable media 512, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 512 provides data storage mechanisms to store media content 514, as well as device applications 516 and any other types of information and/or data related to operational aspects of device 500. For example, an operating system 518 can be maintained as a computer application with the computer-readable media 512 and executed on processor(s) 510. The device applications 516 can include a device manager 520, an auto-view service 522, a media content server, and/or a client device monitor 524 when device 500 is implemented as a content distributor. The device applications 516 are shown as software modules in this example to implement various embodiments of recorded programs ranked based on social networks.

When implemented as a television client device, the device 500 can also include a DVR system 526 with a playback application 528, and recording media 530 to maintain recorded media content 532 that device 500 receives and/or records. The recorded media content 532 can include the media content 514 that is received from a content distributor and recorded. For example, the media content 532 can be recorded when received as a viewer-scheduled recording, or when the recording media 530 is implemented as a pause buffer that records the media content 532 as it is being received and rendered for viewing.

Further, device 500 may access or receive additional recorded media content that is maintained with a remote data store (not shown). Device 500 may also receive media content from an on-demand server, or media content that is maintained at a broadcast center or content distributor that distributes the media content to subscriber sites and client devices. The playback application 528 can be implemented as a media control application to control the playback of media content 514, the recorded media content 532, and/or any other audio, video, and/or image media content which can be rendered and/or displayed for viewing.

Device 500 also includes an audio and/or video output 534 that provides audio and/or video data to an audio rendering and/or display system 536. The audio rendering and/or display system 536 can include any devices that process, display, and/or otherwise render audio, video, and image data. Video signals and audio signals can be communicated from device 500 to a display device via an RF (radio frequency) link, S-video link, composite video link, component video link, DVI (digital video interface), analog audio connection, or other similar communication link. Alternatively, the audio rendering and/or display system 536 can be implemented as integrated components of the example device 500.

Figure 6:
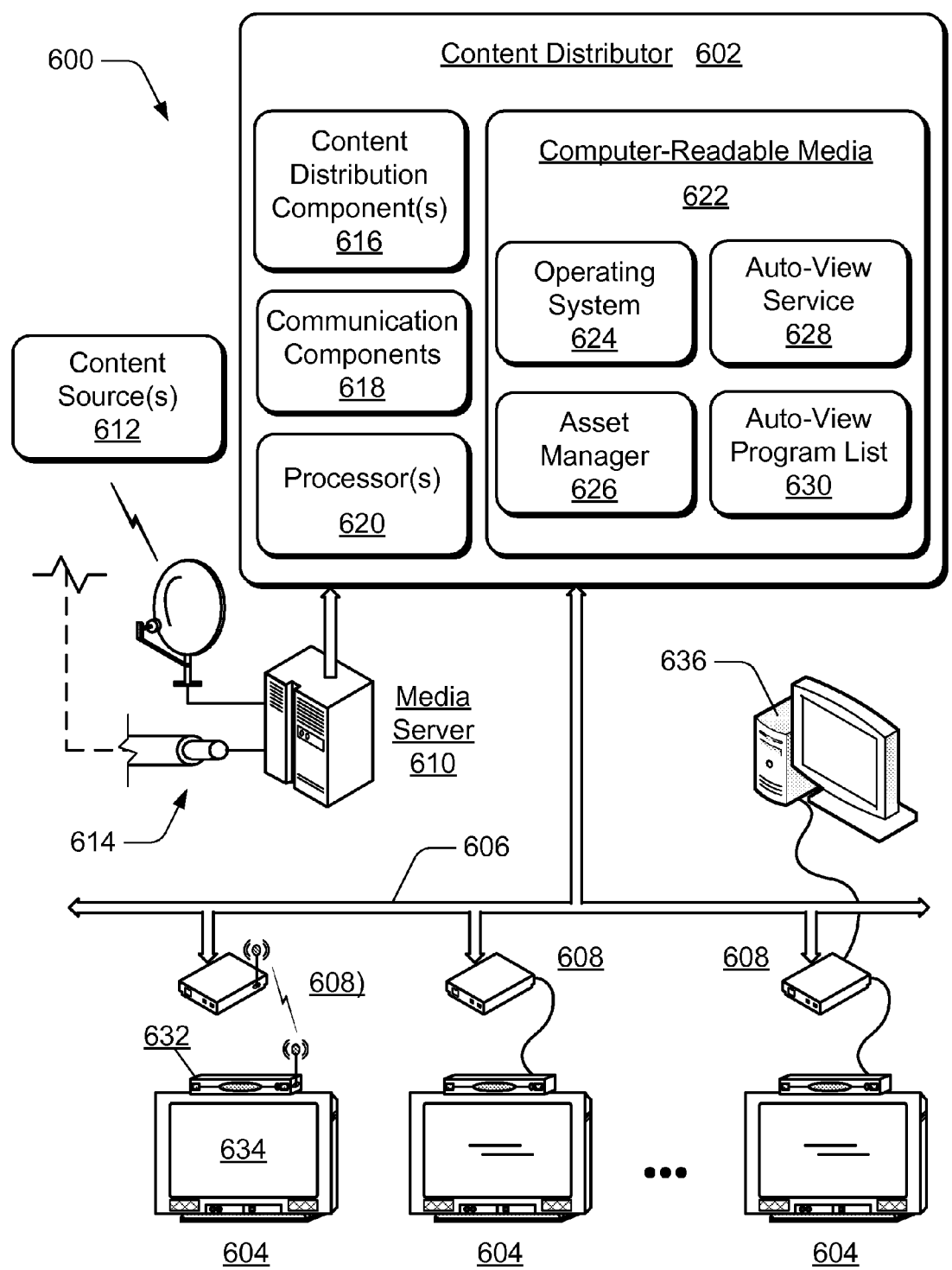
FIG. 6 illustrates various devices and components in an example media content distribution system in which embodiments of recorded programs ranked based on social networks can be implemented.

FIG. 6 illustrates an example entertainment and information system 600 in which various embodiments of recorded programs ranked based on social networks can be implemented. System 600 facilitates the distribution of media content, program guide data, advertising content, and content metadata to multiple viewers and viewing systems. System 600 includes a content distributor 602 and any number of client systems 604 each configured for communication via a communication network 606. Each of the client systems 604 can receive data streams of media content, program content, program guide data, advertising content, closed captions data, content metadata, and the like from content server(s) of the content distributor 602 via the communication network 606.

The communication network 606 can be implemented as any one or combination of a wide area network (e.g., the Internet), a local area network (LAN), an intranet, an IP-based network, a broadcast network, a wireless network, a Digital Subscriber Line (DSL) network infrastructure, a point-to-point coupling infrastructure, or as any other media content distribution network. Additionally, communication network 606 can be implemented using any type of network topology and any network communication protocol, and can be represented or otherwise implemented as a combination of two or more networks. A digital network can include various hardwired and/or wireless links 608, such as routers, gateways, and so on to facilitate communication between content distributor 602 and the client systems 604.

System 600 includes a media server 610 that receives content from various content sources 612, such as media content from a content provider, program guide data from a program guide source, and advertising content from an advertisement provider. In an embodiment, the media server 610 represents an acquisition server that receives audio and video content from a provider, an EPG server that receives the program guide data from a program guide source, and/or an advertising management server that receives the advertising content from an advertisement provider.

The content sources, such as the content provider, program guide source, and the advertisement provider control distribution of the media content, the program guide data, and the advertising content to the media server 610 and/or to other servers of system 600. The media content, program guide data, and advertising content can be distributed via various transmission media 614, such as satellite transmission, radio frequency transmission, cable transmission, and/or via any number of other wired or wireless transmission media. In this example, media server 610 is shown as an independent component of system 600 that communicates the program content, program guide data, and advertising content to content distributor 602. In an alternate implementation, media server 610 can be implemented as a component of content distributor 602.

Content distributor 602 is representative of a headend service in a content distribution system, for example, that provides the media content, program guide data, advertising content, and content metadata to multiple subscribers (e.g., the client systems 604). The content distributor 602 can be implemented as a satellite operator, a network television operator, a cable operator, and the like to control distribution of media content, program and advertising content, such as movies, television programs, commercials, music, and any other audio, video, and/or image content to the client systems 604.

Content distributor 602 includes various content distribution components 616 to facilitate media content processing and distribution, such as a subscriber manager, a device monitor, and one or more content servers. The subscriber manager manages subscriber data, and the device monitor monitors the client systems 604 (e.g., and the subscribers), and maintains monitored client state information.

Although the various managers, servers, and monitors of content distributor 602 (to include the media server 610 in one embodiment) are described as distributed, independent components of content distributor 602, any one or more of the managers, servers, and monitors can be implemented together as a multi-functional component of content distributor 602. Additionally, any one or more of the managers, servers, and monitors described with reference to system 600 can implement features and embodiments of recorded programs ranked based on social networks.

In this example, the content distributor 602 includes communication components 618 that can be implemented to facilitate media content distribution to the client systems 604 via the communication network 606. The content distributor 602 also includes one or more processors 620 (e.g., any of microprocessors, controllers, and the like) which process various computer-executable instructions to control the operation of content distributor 602. The content distributor 602 can be implemented with computer-readable media 622 which provides data storage to maintain software applications such as an operating system 624, an asset manager 626, and an auto-view service 628. The computer-readable media 622 can also provide data storage to maintain an auto-view program list 630 and/or associated auto-view list data for embodiments of recorded programs ranked based on social networks.

The client systems 604 can each be implemented to include a client device 632 and a display device 634 (e.g., a television, LCD, and the like). A client device 632 of a respective client system 604 can be implemented in any number of embodiments, such as a television client device or set-top box, a digital video recorder (DVR) and playback system, an appliance device, a gaming system, and as any other type of client device that may be implemented in an entertainment and information system. In an alternate embodiment, a client system 604 may implemented with a computing device 636 as well as a client device. Additionally, any of the client devices 632 of a client system 604 can implement features and embodiments of recorded programs ranked based on social networks as described herein.

Although embodiments of recorded programs ranked based on social networks have been described in language specific to features and/or methods, it is to be understood that the subject of the appended claims is not necessarily limited to the specific features or methods described. Rather, the specific features and methods are disclosed as example implementations of recorded programs ranked based on social networks.

The invention claimed is:

1. A method, comprising:
maintaining recorded on-demand assets that can be requested by client devices to render as television media content for viewing, the recorded on-demand assets being recorded when initially distributed to the client devices as scheduled television media content;
forming a social network of members based on an association of viewers that correspond to one or more of the client devices;
determining recommended on-demand assets from the recorded on-demand assets based on the association of the viewers that are the members of the social network; and
communicating the recommended on-demand assets to a client device that corresponds to a member of the social network where the client device renders the recommended on-demand assets in succession without viewer interaction, each of the recommended on-demand assets being selectable from a list to initiate rendering of a selected on-demand asset.

2. A method as recited in claim 1, further comprising:
compiling requests for different ones of the recorded on-demand assets from the client devices that correspond to the members of the social network; and
determining the recommended on-demand assets from the compiled requests for the different ones of the recorded on-demand assets.

3. A method as recited in claim 1, further comprising generating an auto-view program list of the recommended on-demand assets for communication to the client devices that correspond to the members of the social network.

4. A method as recited in claim 3, further comprising:
receiving an indication that a client device is activated to render the television media content for viewing; and
communicating the auto-view program list to the client device for display as a user interface from which a recommended on-demand asset can be selected for viewing.

5. A method as recited in claim 3, further comprising:
receiving a viewer selection of a recommended on-demand asset selected from the auto-view program list; and
communicating the recommended on-demand asset to a client device from which the viewer selection is received.

6. A method as recited in claim 1, further comprising:
receiving an indication that a client device is activated to render the television media content for viewing; and
communicating a recommended on-demand asset to the client device to be rendered for viewing without receiving a viewer selection of the recommended on-demand asset.

7. A method as recited in claim 1, wherein the members of the social network are associated as subscribers to an auto-view service that initiates providing the recommended on-demand assets for viewing.

8. A content distributor, comprising:
storage media configured to maintain recorded on-demand assets that can be requested by client devices to render as television media content for viewing, the recorded on-demand assets being recorded when initially distributed to the client devices as scheduled television media content;

an associations module configured to form a social network of members based on an association of viewers that correspond to one or more of the client devices;

a ranking system configured to determine recommended on-demand assets for the members of the social network, the recommended on-demand assets determined from the recorded on-demand assets;

a client device monitor configured to monitor activation states of the client devices and receive an indication that a client device is activated to render the recommended on-demand assets;

a media content server configured to, responsive to the indication that the client device is activated, communicate a recommended on-demand asset to the client device that corresponds to a member of the social network, the recommended on-demand asset being communicated for viewing without receiving a viewer selection of the recommended on-demand asset; and the media content server further configured to communicate the recommended on-demand assets to the client device that renders the recommended on-demand assets in succession without viewer interaction.

9. A content distributor as recited in claim 8, wherein the associations module is further configured to compile requests for different ones of the recorded on-demand assets from the client devices that correspond to the members of the social network, and wherein the ranking system is further configured to determine the recommended on-demand assets based on the compiled requests.

10. A content distributor as recited in claim 8, wherein the associations module is further configured to associate subscribers to an auto view service as the members in the social network.

11. A content distributor as recited in claim 8, further comprising an auto-view service configured to generate an auto-view program list of the recommended on-demand assets for communication to one or more of the client devices that correspond to the members of the social network.

12. A content distributor as recited in claim 11, wherein the auto view service is further configured to initiate communication of the auto-view program list to the client device for display as a user interface from which the recommended on-demand assets can be selected for viewing.

13. One or more computer-readable storage media devices comprising computer executable instructions that, when executed, direct a content distributor to:

record television media content when distributed to client devices as scheduled television programming;

maintain the television media content as recorded on-demand assets that can be requested by a client device when initiated as a viewer selection;

monitor activation states of the client devices for an indication that one or more of the client devices is activated to render recommended on-demand assets;

form a social network of members based on an association of viewers that correspond to one or more of the client devices;

determine the recommended on-demand assets from the recorded on-demand assets based on the association of the viewers that are the members of the social network; and responsive to an indication that the client device is activated to render the recommended on-demand assets, communicate the recommended on-demand assets to the client device that renders the recommended on-demand assets in succession without viewer interaction, each of the recommended on-demand assets being selectable to initiate rendering of a selected on-demand asset.

14. One or more computer-readable storage media devices as recited in claim 13, further comprising computer-executable instructions that, when executed, direct the content distributor to compile requests for different ones of the recorded on-demand assets from the client devices that correspond to the members of the social network, and determine the recommended on-demand assets based on the compiled requests.

15. One or more computer-readable storage media devices as recited in claim 13, further comprising computer-executable instructions that, when executed, direct the content distributor to receive an indication that the client device is activated to render the recommended on-demand assets.

16. One or more computer-readable storage media devices as recited in claim 13, further comprising computer-executable instructions that, when executed, direct the content distributor to generate an auto-view program list of the recommended on-demand assets for communication to the client devices that correspond to the members of the social network.

17. One or more computer-readable storage media devices as recited in claim 16, further comprising computer-executable instructions that, when executed, direct the content distributor to communicate the auto-view program list to the client devices for display as a user interface from which the recommended on demand assets can be selected for viewing.

18. One or more computer-readable storage media devices as recited in claim 13, further comprising computer-executable instructions that, when executed, direct the content distributor to include the members of the social network based on subscribers to an auto-view service.

* * * * *